United States Patent [19]

Reunamäki

[11] Patent Number: 5,032,162
[45] Date of Patent: Jul. 16, 1991

[54] ASSEMBLY IN THE ANNEALING SECTION OF A GLASS TEMPERING APPARATUS

[75] Inventor: Pauli Reunamäki, Tampere, Finland

[73] Assignee: Tamglass Oy, Tampere, Finland

[21] Appl. No.: 113,508

[22] Filed: Oct. 28, 1987

[30] Foreign Application Priority Data

Oct. 29, 1986 [FI] Finland ................................. 864395

[51] Int. Cl.⁵ ..................... C03B 25/08; C03B 27/016; C03B 27/044
[52] U.S. Cl. ......................................... 65/348; 65/114; 65/119; 65/374.1
[58] Field of Search .................. 65/119, 120, 348, 351, 65/374.1, 114

[56] References Cited

U.S. PATENT DOCUMENTS

| | | | |
|---|---|---|---|
| 3,294,513 | 12/1966 | Beattie | 65/348 X |
| 3,607,198 | 9/1971 | Meunier et al. | 65/119 X |
| 3,776,712 | 12/1973 | Wilde | 65/348 |
| 3,923,488 | 12/1975 | Pytel et al. | 65/119 X |
| 4,111,676 | 9/1978 | Mechling et al. | 65/351 X |

Primary Examiner—Richard V. Fisher
Attorney, Agent, or Firm—Burns, Doane, Swecker & Mathis

[57] ABSTRACT

The invention relates to an assembly in the annealing section of a glass tempering apparatus, comprising a glass sheet supporting rollers and cooling air blow boxes disposed above and below a glass sheet. A blast pressure applied to the bottom surface of a glass sheet may tend to pick up a glass sheet and float the sheet off contact with the rollers. In order to correct the situation without changing the cooling effects on the opposite surfaces of glass, the radiation absorption factor of surfaces below a glass sheet is higher than the absorption factor of surfaces above on the thermal radiation wavelengths of glass. Thus, the blast pressure on a top surface of the glass sheet has been increased with respect to the blast pressure on a lower surface of the glass sheet.

13 Claims, 2 Drawing Sheets

ASSEMBLY IN THE ANNEALING SECTION OF A GLASS TEMPERING APPARATUS

The present invention relates to an assembly in the annealing section of a glass tempering apparatus, comprising supporting rollers for a glass sheet and cooling air blow boxes are disposed above and below a glass sheet.

A glass sheet carrying rollers cause an asymmetric cooling effect as they restrain the movement of cooling air. A consequence of this is that cooling effect below a glass sheet would remain lower unless blast pressure is increased with respect to overhead blast pressure. However, an increase of blast pressure produces a bearing air cushion below a glass sheet and thus the glass sheet tends to float or hover off the contact with rollers, whereby the movements and transport of glass sheets become uncontrollable. This effect is further increased by the fact that blast jets force their way into wedge-shaped spaces between the rollers and a glass sheet.

The problem is significant especially with thin glass sheets as they require higher cooling effects which means that pressures and, accordingly, pressure differences increase while the weight is reduced. In practice, this sets a certain minimum limit for glass thickness and glass sheets thinner than that have been impossible to temper properly.

Efforts have been made to overcome the problem e.g. by preventing the discharge of air from the top portion of an annealing or cooling section for increasing the pressure above a glass sheet. However, between and around the glass sheets there remains so much accessible space that this does not provide a substantial remedy to the problem.

Another attempt to solve the problem has been to position nozzles above and below a glass sheet at various distances therefrom. This affects also a cooling effect in a manner that, if e.g. the pressure below is to be reduced by pulling blast nozzles further away, the cooling effect is reduced at the same time and this requires the increase of blast pressure, whereby the effect of such pulling-away is mostly compensated for.

One practical approach for slightly alleviating the problem has been to mount above the glass sheets and between the blow boxes false rolls shaped as a downward open trough which deflect the air flow rising up from a glass sheet back towards the glass sheet and thus increase a pressure effect on the top surface of a glass sheet. By virtue of this solution, it has been possible to temper slightly thinner glass sheets than before.

An object of the invention is to provide an assembly for substantially increasing a pressure effect above a glass sheet for maintaining a glass sheet in contact with the rollers without, however, increasing the cooling effect on the top surface of a glass sheet.

According to the invention, this object is achieved in a manner that the radiation absorption factor of the surfaces below a glass sheet is higher than the absorption factor of the surfaces above a glass sheet on the thermal radiation wavelengths of glass, whereby the cooling effect based on thermal radiation below a glass sheet has increased and, correspondingly, the cooling effect based on convection or a blast pressure on the top surface of a glass sheet has been increased with respect to the blast pressure underneath so as to prevent a glass sheet from floating or hovering off the contact with rollers.

By virtue of this solution, it is possible to temper thinner glass sheets than before but naturally it also facilitates tempering of other glass sheets with effective and uniform cooling or annealing on both surfaces of glass without a risk of a glass sheet becoming afloat.

BRIEF DESCRIPTION OF THE DRAWINGS

The invention will now be described in more detail with reference made to the accompanying drawings, in which

FIG. 1 shows a glass sheet as supported by rollers 7 in the annealing and cooling section of a glass tempering apparatus. Disposed above a glass sheet are cooling air blow boxes 1, connected by air ducts to a blower 5, and below are shown blow boxes 3, connected by air ducts to a blower 6. The upper and lower blow boxes 1 and 3 can also be connected to a common blower for distributing blast air by means of pressure control units.

Figure 1:
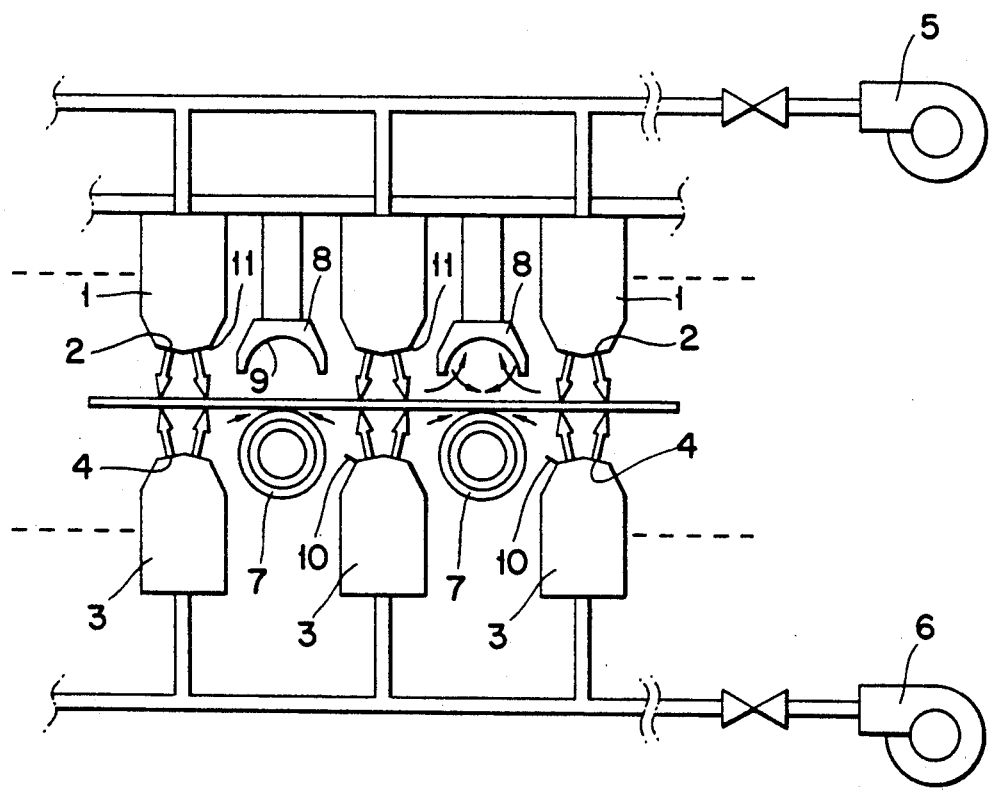
FIG. 1 shows a part of the annealing section of a glass tempering apparatus schematically in side view and FIG. 2 illustrates the dependence of a total cooling effect applied to one surface of a glass sheet upon the cooling air blast pressure.

Blow boxes 1 and 3 extend in a direction crosswise to the glass sheet conveying direction or parallel to rollers 7. Blow boxes 1 and 3 are provided with orifices 2 and 4 in two adjacent arrays so that blast air jets are directed obliquely towards the surface of a glass sheet.

Aligned with rollers 7 above a glass sheet are "false rolls" 8, having a surface 9 in the shape of a downward open trough. These false rolls 8 increase the pressure applied to the top surface of a glass sheet by deflecting air flows coming up from a glass sheet back towards the glass sheet.

Rollers 7 impede the circulation of cooling air on the bottom surface of a glass sheet and thus decrease the bottom surface cooling effect to such a degree that the increase of underneath blast pressure required for compensating for this decreased cooling effect results in thin glass sheet rising off said rollers 7. This undesired pehnomenon is further intensified by the fact that blast air tends to force its way into wedge-shaped spaces between the rollers and a glass sheet. The problem has been resolved by making the radiation absorption factor of the surfaces below a glass sheet, especially that of box surfaces 10 and roller bodies 7, higher than the absorption factor of the surfaces above said glass on the thermal radiation wavelengths of glass.

Thus, when the total cooling effect of both surfaces of a glass sheet is substantially equal, the radiation cooling of the top surface will be lower, but the convection cooling will be higher than the corresponding bottom surface cooling components.

Figure 2:
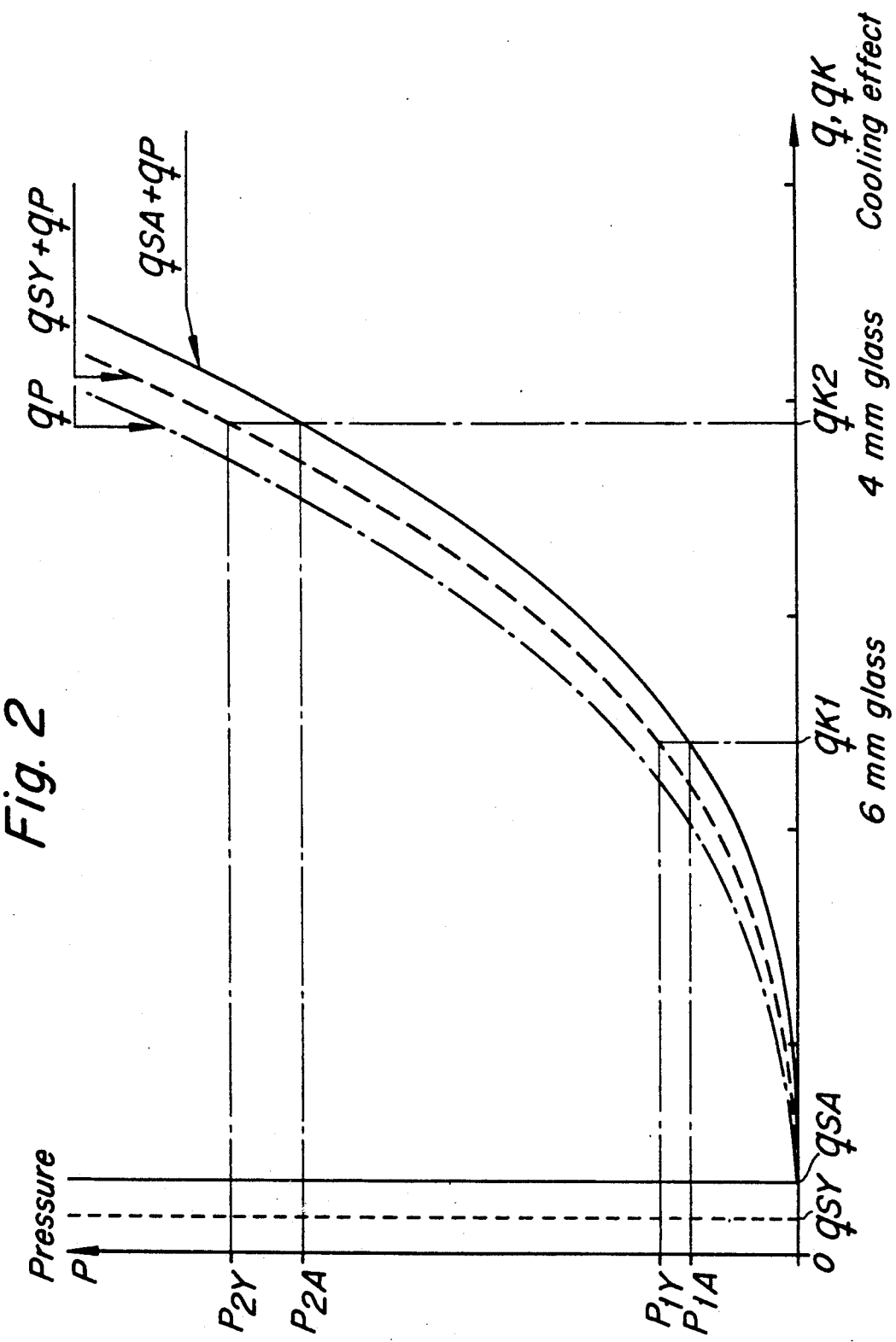

Although the cooling effect based on radiation is just a fraction of the cooling effect based on convection, the effect obtained by the invention is pronounced especially on thin glasses. This is illustrated in FIG. 2, wherein the X-axis generally represents a cooling effect q and particularly a cooling effect $q_k$, the latter being the sum of a cooling effect $q_s$ and a heat transfer effect $q_p$ resulting from the cooling blast. The Y-axis represents a cooling blast pressure P, which produces a cooling effect $q_p$. The figure shows by way of an example a situation where the mean absorption factor of the surfaces below glass is twice as much as that above glass, whereby the cooling effect $q_{SA}$ transferring from the bottom surface of glass by means of radiation is also twice as much as the corresponding effect $q_{SY}$ from the top surface of glass. The dash-and-dot line curve $q_{SY}+q_p$ thus represents the total cooling effect from the top surface of glass and, accordingly, the solid-line curve $q_{SA}+q_p$ represents the total cooling effect from the bottom surface of glass. A typical feature in tempering is to aim at the same cooling effect $q_k$ on both surfaces of glass or otherwise glass is prone to bend during the process.

FIG. 2 illustrates also a typical cooling effect $q_{k1}$, required by 6 mm glass with respect to a cooling effect $q_{k2}$, required by 4 mm glass. It can be readily noted from the figure how the difference between corresponding blast pressures increases as glass becomes thinner. On 6 mm glass this difference is $P_{1Y}-P_{1A}$ and on 4 mm glass it is $P_{2Y}-P_{2A}$.

For the sake of clarity it should be noted, as pointed out before, that function $q_p$ is different on different sides of glass, i.e. the demand for pressure is greater below for providing an equal, blast-induced cooling effect. The figure indicates, however, that this undesired phenomenon can be compensated for by having different absorption factors below and above the glass.

By having the absorption factor of the surfaces below glass as high as possible, preferably higher than 0,8, the radiation cooling above a glass sheet can be maintained the same in most cases, which offers the advantage that radiation cooling need not be replaced with power-consuming convection cooling but the convection and blast pressure below glass can be reduced. However, if this is not sufficient for producing a desired compensation effect, it is possible to use surfaces above glass, whose absorption factor is below 0,5 or 0,4. Especially the trough surfaces 9 of false rolls 8 can be designed so as to reflect heat rays on the thermal radiation wavelengths of glass.

Below the glass, it is possible to arrange also other surfaces having a high absorption factor than surfaces 10 of jet boxes 3. The absorption factor of surfaces 11 above the glass can be substantially lower than the absorption factor of surfaces 10 of boxes 3 underneath.

It is obvious that the invention is not limited to the above embodiment but that the structural details may vary in many ways within the scope of the annexed claims. An essential feature in the invention is that a proper selection of the absorption factors of the surfaces below and above a glass sheet can be used to create conditions, in which the tempering of thinner glass sheets than before has been made possible while at the same time improving the blast tempering conditions for glass sheets of all thicknesses.

I claim:

1. An assembly in the annealing section of a glass tempering apparatus, comprising glass sheet supporting rollers and cooling air blow boxes disposed above and below a glass sheet, wherein the radiation absorption factor of a plurality of surfaces below the glass sheet is higher than the absorption factor of a plurality of surfaces above the glass sheet on the thermal radiation wavelengths of glass, whereby a cooling effect based on heat radiation below the glass sheet has increased and correspondingly a cooling effect based on convection, i.e. a blast pressure, on a top surface of the glass sheet has been increased with respect to a blast pressure on a lower surface of the glass sheet so as to prevent the glass sheet from floating out of contact with the rollers.

2. An assembly as set forth in claim 1, wherein the absorption factor of the plurality of surfaces below the glass sheet is higher than 0.8.

3. An assembly as set forth in claim 2, wherein the absorption factor of the plurality of surfaces above the glass sheet is below 0.5.

4. An assembly as set forth in claim 2, wherein said cooling air blow boxes below the glass sheet have surfaces which define said plurality of surfaces having the higher radiation absorption factor 5. An assembly as set forth in claim 1, wherein the absorption factor of the plurality of surfaces above the glass sheet is below 0.5.

6. An assembly as set forth in claim 5, further comprising false rolls shaped as a downward open trough above the glass sheets, wherein trough surfaces of said false rolls define said plurality of surfaces having the lower radiation absorption factor.

7. An assembly as set forth in claim 1, wherein said cooling air blow boxes below the glass sheet have surfaces which define said plurality of surfaces having the higher radiation absorption factor.

8. An assembly as set forth in claim 1, further comprising false rolls shaped as a downward open trough above the glass sheets, wherein trough surfaces of said false rolls define said plurality of surfaces having the lower radiation absorption factor.

9. An assembly as set forth in claim 1, wherein the ratio between the radiation absorption factors of the surfaces above and below the glass sheet are such that the total cooling effect on the top and lower surfaces of the glass sheet is substantially equal, the radiation cooling effect is lower and the convection cooling is higher on the top surface of the glass sheet than the corresponding radiation and convection cooling effect on the lower surface of the glass sheet.

10. An assembly as set forth in claim 9, wherein the absorption factor of the plurality of surfaces below the glass sheet is higher than 0.8.

11. An assembly as set forth in claim 9, wherein the absorption factor of the plurality of surfaces above the glass sheet is below 0.5.

12. An assembly as set forth in claim 9, wherein said cooling air blow boxes below the glass sheet have surfaces which define said plurality of surfaces having the higher radiation absorption factor.

13. An assembly as set forth in claim 9, further comprising false rolls shaped as a downward open trough above the glass sheets, wherein trough surfaces of said false rolls define said plurality of surfaces having the lower radiation absorption factors.

* * * * *